(12) United States Patent
Phillips

(10) Patent No.: US 7,216,938 B2
(45) Date of Patent: May 15, 2007

(54) WHEEL WEIGHT WITH BODY HAVING RECESS AND CLIP SECURED THEREIN

(75) Inventor: Shelah Phillips, Murfreesboro, TN (US)

(73) Assignee: Perfect Equipment Inc., Lavergne, TN (US)

( * ) Notice: Subject to any disclaimer, the term of this patent is extended or adjusted under 35 U.S.C. 154(b) by 0 days.

(21) Appl. No.: 10/797,782

(22) Filed: Mar. 9, 2004

(65) Prior Publication Data

US 2005/0104439 A1   May 19, 2005

Related U.S. Application Data

(60) Provisional application No. 60/520,264, filed on Nov. 14, 2003.

(51) Int. Cl.
*B60B 1/00* (2006.01)

(52) U.S. Cl. .................................................. 301/5.21
(58) Field of Classification Search ................ 301/5.21
See application file for complete search history.

(56) References Cited

U.S. PATENT DOCUMENTS

| | | | |
|---|---|---|---|
| 382,091 A | 5/1888 | Kelsea | |
| 2,122,064 A | 6/1938 | Hume | 301/5.21 |
| 2,202,129 A * | 5/1940 | Turner | 301/5.21 |
| 2,221,747 A * | 11/1940 | Turner | 301/5.21 |
| 2,248,265 A * | 7/1941 | Wright | 301/5.21 |
| 2,258,011 A * | 10/1941 | Inman | 301/5.21 |
| 2,304,816 A | 12/1942 | Griffith | 301/5.21 |
| 2,370,361 A | 2/1945 | Jeune | 301/5.21 |
| 2,632,673 A | 3/1953 | Pfeiffer | 301/5.21 |
| 2,640,727 A | 6/1953 | Kennedy | 301/5 |
| 2,765,998 A | 10/1956 | Engert | 248/29 |
| 3,002,388 A | 10/1961 | Bageman | 301/5.21 |
| 3,154,347 A | 10/1964 | Griffith | 301/5.21 |
| 3,273,941 A | 9/1966 | Skidmore | 301/5.21 |
| 3,669,500 A | 6/1972 | Ende | 301/5.21 |
| 3,960,409 A | 6/1976 | Songer | 301/5.21 |
| 4,300,803 A | 11/1981 | Cjorosevic | 301/5.21 |
| 4,619,253 A | 10/1986 | Anhauser et al. | 602/42 |
| 5,350,220 A | 9/1994 | Atwell, Jr. | 301/5.21 |
| 5,507,333 A | 4/1996 | Augier | 152/379.3 |
| 5,770,288 A | 6/1998 | Carney, Jr. | 428/40.1 |
| 5,876,817 A | 3/1999 | Mathna et al. | 428/40.1 |
| 6,238,005 B1 | 5/2001 | Sugayauchi et al. | 301/5.21 |
| 6,250,721 B1 | 6/2001 | Oba et al. | 301/5.21 |
| 6,260,929 B1 | 7/2001 | Oba et al. | 301/5.21 |
| 6,286,906 B1 | 9/2001 | Nagashima et al. | 301/5.21 |
| 6,364,422 B1 * | 4/2002 | Sakaki et al. | 301/5.21 |
| 6,413,626 B1 | 7/2002 | Wollner | 428/317.3 |
| 6,553,831 B1 | 4/2003 | Schmidt et al. | 73/470 |
| 7,055,914 B1 * | 6/2006 | Jenkins et al. | 301/5.21 |

\* cited by examiner

*Primary Examiner*—Russell D. Stormer
(74) *Attorney, Agent, or Firm*—Woodcock Washburn LLP

(57) ABSTRACT

A wheel-balancing weight mounts to a wheel with a flange. The weight has a weighted body and a clip securely attached thereto. The body defines a recess therein, and the clip has a securing portion formed to be securely positioned within the recess defined in the body and a grasping portion for securely grasping the flange. The recess of the body allows the clip to be axially positioned with respect to such body so that the body is axially shifted toward the mounted-to wheel to achieve a proper fit to the wheel. The securing portion of the clip is secured within the recess by flowing a portion of the body adjacent such clip into contact therewith.

10 Claims, 3 Drawing Sheets

US 7,216,938 B2

WHEEL WEIGHT WITH BODY HAVING RECESS AND CLIP SECURED THEREIN

CROSS-REFERENCE TO RELATED APPLICATION

The present application claims the benefit of U.S. Provisional Application No. 60/520,264, filed Nov. 14, 2003 and entitled "WHEEL WEIGHT WITH BODY HAVING RECESS AND CLIP SECURED THEREIN", hereby incorporated by reference in its entirety.

FIELD OF THE INVENTION

The present invention relates to a wheel-balancing weight for balancing a wheel of a vehicle or the like. More particularly, the present invention relates to a wheel balancing weight with a body having a recess and a clip received within the recess.

BACKGROUND OF THE INVENTION

In the manufacture of pneumatic tires and also wheels and rims for pneumatic tires, it is exceedingly difficult if not impossible to produce a tire, a wheel, or the combination thereof in perfect rotational balance. As known, when out of balance, such a tire, wheel, or combination thereof, vibrates excessively upon rotation and can cause damage to adjacent, coupled-to and/or related components.

Accordingly, and as is known, such tire, wheel, or combination thereof is balanced by appropriately applying one or more counter-balancing weights to compensate for a measured imbalance. Methods of measuring imbalance and determining where to apply the counter-balancing weights are generally known to the relevant public and therefore need not be described herein.

Heretofore, such a counter-balancing weight has been constructed to have a body formed from lead or the like as a unitary mass around a steel clip, where the steel clip securely clips on to an exterior circumferential flange or lip at the rim of the wheel. However, the use of lead has come to be discouraged for environmental reasons, among others.

Accordingly, a need exists for a wheel-balancing weight with a body formed from a material other than lead. More particularly, a need exists for such a wheel-balancing weight where the clip is secured to the body in the axial, circumferential, and radial directions with respect to the axis of rotation of the wheel, and where the body is well-positioned with respect to the wheel when the weight is mounted to such wheel. Still more particularly, a need exists for such a wheel-balancing weight that is simple in design and manufacture and therefore is affordable in cost.

SUMMARY OF THE INVENTION

The aforementioned need is satisfied by a wheel-balancing weight for mounting to a wheel with a flange. The weight has a weighted body and a clip securely attached thereto. The body defines a recess therein, and the clip has a securing portion formed to be securely positioned within the recess defined in the body and a grasping portion for securely grasping the flange. The recess of the body allows the clip to be axially positioned with respect to such body so that the body is axially shifted toward the mounted-to wheel to achieve a proper fit to the wheel. The securing portion of the clip is secured within the recess by flowing a portion of the body adjacent such clip into contact therewith.

BRIEF DESCRIPTION OF THE DRAWINGS

The foregoing summary as well as the following detailed description of the present invention will be better understood when read in conjunction with the appended drawings. For the purpose of illustrating the invention, there are shown in the drawings embodiments that are presently preferred. As should be understood, however, the invention is not limited to the precise arrangements and instrumentalities shown. In the drawings.

DETAILED DESCRIPTION OF PREFERRED EMBODIMENTS

Figure 1:
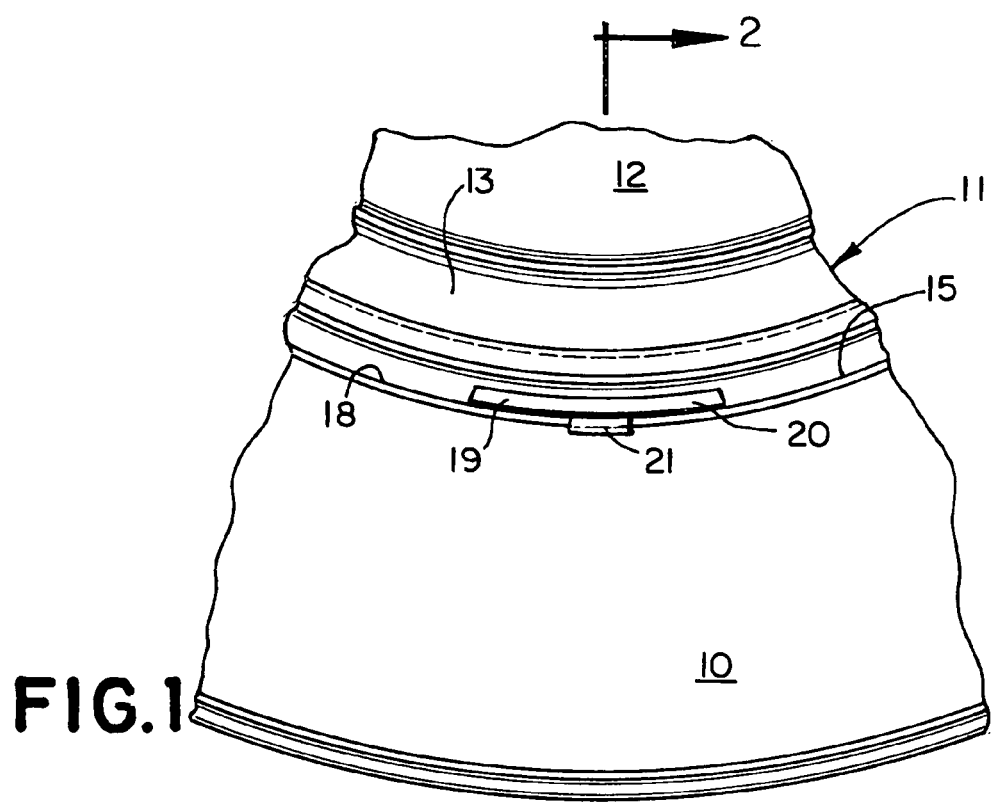
FIG. 1 is a broken-away perspective view of a wheel-balancing weight in accordance with one embodiment of the present invention, where the weight is mounted to a rim of a wheel.

Certain terminology may be used in the following description for convenience only and is not considered to be limiting. For example, the words "left", "right", "upper", and "lower" designate directions in the drawings to which reference is made. Likewise, the words "inwardly" and "outwardly" are directions toward and away from, respectively, the geometric center of the referenced object. The terminology includes the words above specifically mentioned, derivatives thereof, and words of similar import.

Figure 2:
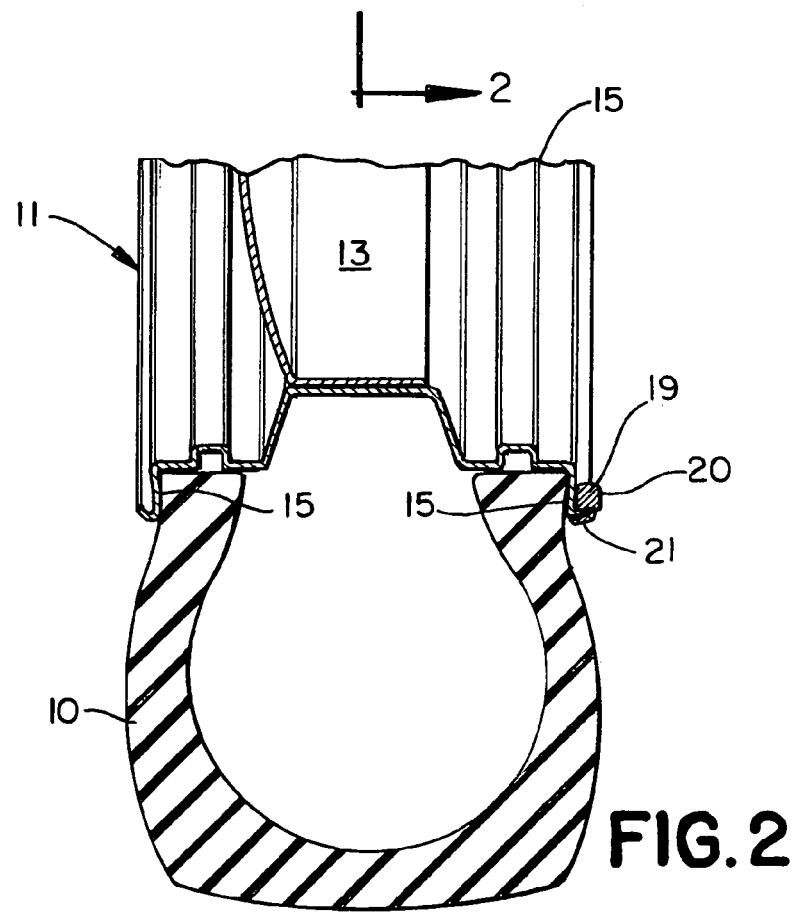
FIG. 2 is a cross-sectional view of the weight and wheel of FIG. 1 taken along the line 2—2 of FIG. 1.

As shown in FIGS. 1 and 2, a pneumatic tire 10 such as may be used in connection with an automobile or the like is mounted upon a rim 11 of an automobile wheel 12 or the like. An example of such a tire 10, rim 11, and wheel 12 is shown and disclosed in U.S. patent application Ser. No. 09/723,367, filed Nov. 28, 2000 and hereby incorporated by reference in its entirety. U.S. patent application Ser. No. 10/666,155, filed Sep. 19, 2003 as "Wheel Balancing Weight With Half-Clip" is also incorporated by reference in its entirety.

It is to be appreciated that the tire 10 may be mounted to the wheel 12 in any conventional or unconventional manner and that the tire 10 may be of any variety or manufacture without departing from the spirit or scope of the present invention. The tire 10 and wheel 12 or wheel 12 alone may be balanced manually or by spin balancing or by any other method without departing from the spirit and scope of the present invention.

As is known, a wheel 12 and a wheel 12 with tire 10 mounted thereupon are balanced with respect to the rotational axis thereof and in particular can be balanced on both the inboard and outboard sides of the wheel 12 at or about the rim 11 thereof. Generally, a wheel 12 with or without a tire 10 mounted thereupon is balanced by measuring the imbalance and then attaching a weighted mass or weight 20 at an angular location on the rim 11 of the wheel 12 such that the measured imbalance is counter-balanced by the weight 20.

Typically, a rim 11 of a wheel 12 extends both axially and circumferentially. The wheel 12 also includes a central well portion through which bolts on a vehicle typically extend to attach the wheel to such vehicle. As seen in FIG. 1, the rim 11 contains one or more flanges 15 extending generally axially and/or radially outwardly from the rim 11 and circumferentially around the rim 11. The rim 11 typically has an inboard flange 15 corresponding to an inboard side of the tire 10 and an outboard flange 15 corresponding to an outboard side of the tire 10, only one such flange 15 being shown in FIG. 1.

Each flange 15 as shown may be constructed during formation of the wheel 12 by crimping or otherwise forming a distal portion of the rim 11 so as to extend the rim 11 axially, radially, or both. As may be appreciated, each flange 15 acts to secure the pneumatic tire 10 onto the rim 11. Also, and as particularly seen in FIG. 2, each flange 15 defines a pocket 18 adjacent the wheel 12 within which the weighted body 19 of a wheel balancing weight 20 typically should be nestled to achieve proper balancing. As may be appreciated, the pocket 18 defined by the flange 15 extends generally circumferentially with respect to the wheel, and the weighted body 19 should therefore also extend in an arcuate manner so as to follow the generally circumferential pocket 18 and be nestled therein.

It is to be recognized that the flange 15 may also have other dimensional features without departing from the spirit and scope of the present invention. As shown in the drawings, the flange 15 extends generally axially and generally radially outwardly in an S-shape as viewed in toroidal cross-section, but it should be understood that the flange 15 may extend in another direction. Additionally, the flange 15 may vary in dimension, location and in number, all without departing from the spirit and scope of the invention.

Typically, a wheel balancing weight 20 such as that shown in FIGS. 1 and 2 includes a clip 21 for attaching the weighted body 19 thereof to the flange 15 of the wheel 12. The clip 21 is constructed in an appropriate shape and manner from a durable material such as spring steel so that the clip 21 securely attaches the body 19 to the flange 15. Although the weighted body 19 could be formed from any particular material and in any particular manner without departing from the spirit and scope of the present invention, it is presently desirable to construct the body 19 from a material other than lead, primarily for environmental reasons. In such a case, the body 19 may be constructed from a material such as steel, copper, brass, or the like, by way of stamping, forming, rolling, pressing, casting, or the like.

In the prior art, where the body 19 was constructed from lead, it was typical to form the wheel-balancing weight 20 by positioning molten lead around a portion of the clip 21 thereof, perhaps with the aid of a mold. However, in the case where the body 19 is constructed from another material such as steel, which has a higher melting point than lead, the same molten construction technique is not feasible for the reason that the molten steel would likely melt or deform the clip, among others. Accordingly, and in one embodiment of the present invention, the body 19 of the weight 20 is constructed apart from the clip 21 of the weight 20 and is then attached thereto.

In particular, and referring now to FIGS. 3A–3C and 4A–4D, it is seen that in one embodiment of the present invention, the body 19 is formed to have a front or outboard face 23 for facing away from the mounted-to wheel 12 and a back or inboard face 25 for facing toward the mounted-to wheel 12, and the inboard face 25 defines therein a recess 27 extending generally inwardly with respect to the body 19. Of course, the recess 27 may also be defined in the outboard face 23 without departing from the spirit and scope of the present invention.

As shown at least in FIGS. 3A, 3B, 4A, and 4B, the body 19 extends in a generally arcuate manner so that such body 19 follows the generally circumferential pocket 18 of the wheel (FIG. 1), and the recess 27 is generally centered with respect to the arcuate extent of the body 19. Note, though, that such arcuate centering is not believed to be necessary at least for purposes of the present invention.

As also shown in at least FIGS. 3B, 3C, 4B, and 4C, the body 19 is formed to have an inner radial face 29 for facing toward the axis of the mounted-to wheel 12 and an outer radial face 31 for facing away from the axis of the mounted-to wheel 12, and the defined recess 27 also extends radially along the inboard face 25 from the outer radial face 31 toward the inner radial face 29. As seen, the defined recess 27 extends along such inboard face 25 substantially to such inner radial face 29, although it is to be appreciated that the recess may also stop short of such inner radial face 29 without departing from the spirit and scope of the present invention.

As further shown in at least FIGS. 3A, 3C, 4A, and 4C, the defined recess 27 continues extending axially along the outer radial face 31 of the body 19 from the inboard face 25 toward the outboard face 23. As seen, the defined recess 27 extends substantially to such outboard face 23, although it is to be appreciated that the recess may also stop short of such outboard face 23 without departing from the spirit and scope of the present invention. As also seen, the recess 27 transitions from radial extension to axial extension along a curvature, although such transition may also be along a more abrupt corner, for example.

However such recess 27 is in fact defined in the body 19 of the weight 20, such recess 27 may be formed in any appropriate manner without departing from the spirit and scope of the present invention. For example, such recess 27 may be formed along with the body 19 during formation of such body 19, perhaps by way of a molding operation, or may be formed after the body 19 is formed, perhaps by way of a stamping operation, pressing operation, or a milling operation. Note that if a stamping operation or pressing operation is employed, the stamped or pressed recess 27 may displace body material from the inboard face 25 to the outboard face 23 with the result being a protrusion (not shown) at such outboard face 23.

Methods of forming a recess such as the recess 27 in a body such as the body 19 are generally known or should be apparent to the relevant public and therefore need not be set forth herein in any detail. Accordingly, any appropriate method of forming the body 19 and the recess 27 defined therein may be employed without departing from the spirit and scope of the present invention.

Referring now to FIGS. 4A–4D and 5 in particular, it is seen that in one embodiment of the present invention, the clip 21 of the weight 20 is formed to be positioned within the recess 27 defined in the body 19 of the weight 20. In particular, and as seen, the clip 21 is formed to be a generally flat but bent or curved piece of material, and has a radial portion 33 for being positioned within the recess 27 at the inboard face 25 of the body 19 and an axial portion 35 for being positioned within the recess 27 at the outer radial face 31 of the body 19.

As shown, each of the radial portion 33 and the axial portion 35 is generally planar, and is positioned within the recess 27 in a manner so that the planar portion 33, 35 is generally parallel to the corresponding face 25, 31. As also shown, the radial portion 33 transitions to the axial portion 35 along the transition of the recess 27 from radial extension to axial extension thereof. As will be set forth in more detail below, the radial portion 33 and axial portion 35 of the clip 21 as positioned within the recess 27 of the body 19 co-act with the body 19 to secure the clip 21 to the body 19.

As also seen, the clip 21 of the weight 20 is further formed to have a grasping portion 37 by which the clip 21 may securely grasp the flange 15 of the wheel 12 at an appropriate circumferential location thereof. As shown, the grasping portion 37 of the clip 21 co-acts with the axial portion 35 of the clip 21 to perform such a grasping function, whereby the grasping portion 37 follows along with but is separate from the axial portion 35 such that the flange 15 may be fitted and securely grasped therebetween. Thus, the grasping portion 37 and the axial portion 35 of the clip 21 in combination define a compartment 39 within which the flange 15 is received. As also shown, the grasping portion 37 may include a securing tab 38 that interacts with the flange 15 of the wheel 12 to secure the clip 21, body 19, and weight 20 to the flange 15.

Note that the clip 21 may have any appropriate design without departing from the spirit and scope of the present invention as long as the clip 21 is defined to fit within the recess 27 of the body 19. For example, if the recess 27 does not extend axially along the body 19, such clip 19 need not likewise have the axial portion 35 shown, although it is to be appreciated that some portion of the clip 21 should be designed to co-act with the grasping portion 37 thereof. However such clip 21 is in fact designed, such clip 21 may be formed in any appropriate manner without departing from the spirit and scope of the present invention. For example, such clip 21 may be formed by way of a molding operation, a stamping operation, a bending operation, a milling operation, or a combination thereof. Methods of forming a clip such as the clip 21 are generally known or should be apparent to the relevant public and therefore need not be set forth herein in any detail. Accordingly, any appropriate method of forming the clip 21 may be employed without departing from the spirit and scope of the present invention.

Figure 4A:
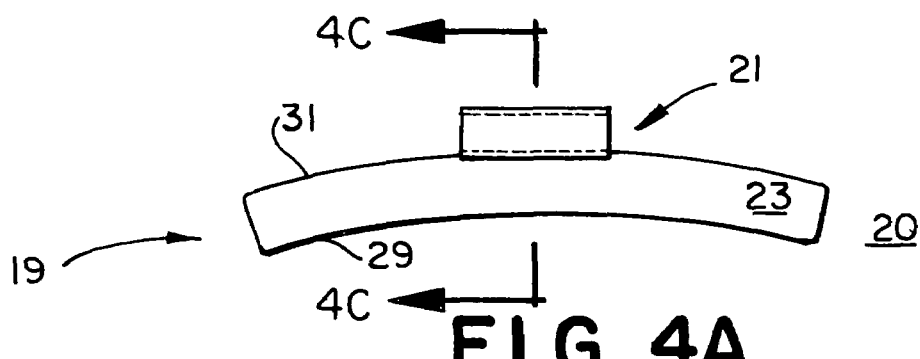
FIGS. 4A and 4B are outboard and inboard side views of the weight of FIG. 1, including the body and a clip attached thereto.
Figure 4B:
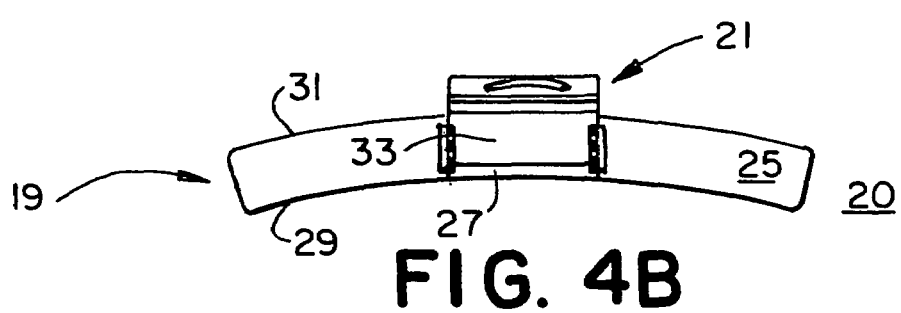
Figure 4C:
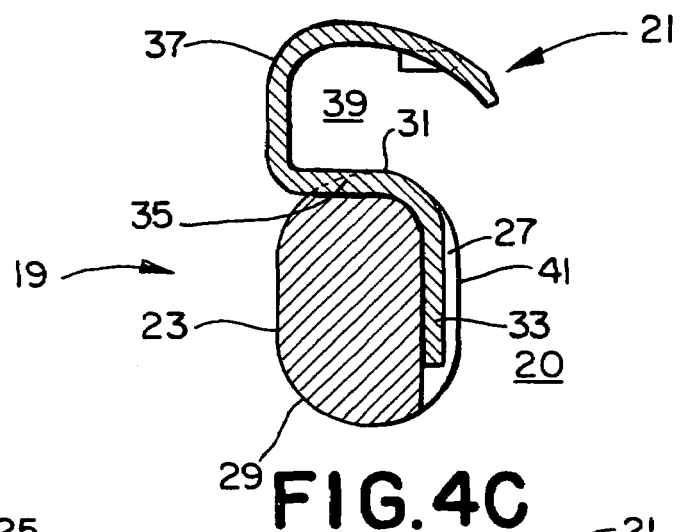
FIG. 4C is a cross-sectional view of the body and clip of FIGS. 4A and 4B taken along the line 4C—4C in FIG. 4A.

As might best be appreciated with reference to FIG. 4C, and in one embodiment of the present invention, the recess 27 of the body 19 allows the clip 21 to be positioned with respect to such body 19 so that the body 19 is more intimately nestled within the pocket 18 defined by the flange 15 when the weight 20 is mounted to such flange 15 at an appropriate circumferential location thereof. That is, the recess 27 allows the clip 19 to be positioned more internally with respect to the body 19 in an axial manner with respect to the mounted-to wheel 12, and thereby axially shifts the body 19 toward the wheel 12 and further into the pocket 18 defined by the flange 15 thereof. As was set forth above, the weighted body 19 of the weight 20 should be well-nestled in such pocket 18 to achieve proper balancing. As well-nestled, the mounted weight 20 achieves a better weight-to-wheel fit that is similar in function and effect to a typical prior art molded lead weight.

Figure 4D:
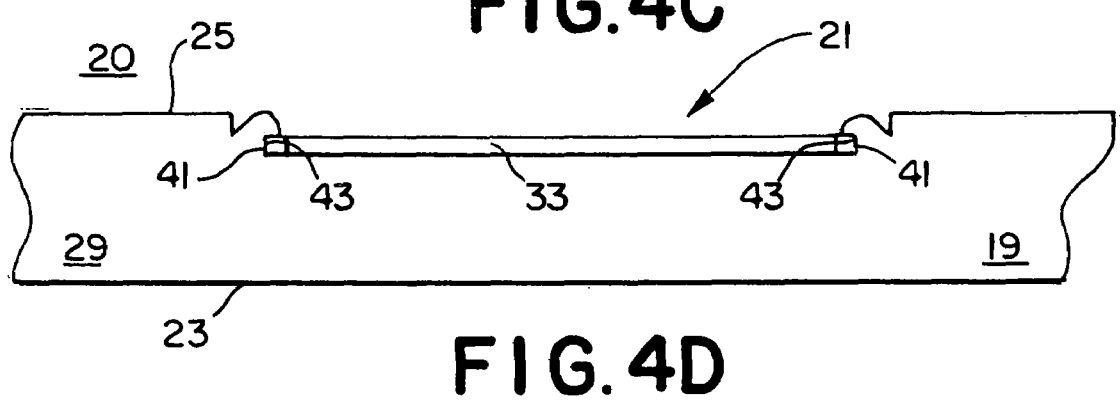
FIG. 4D is a broken-away bottom view of the body and the clip of FIG. 4B.

As might best be appreciated with reference to FIGS. 4B and 4D, and in one embodiment of the present invention, the recess 27 of the body 19 also allows the clip 21 to be secured with respect to such body 19 without external securing devices. In particular, within such recess 27, the clip 21 may be secured to the body 19 by crimping, welding, soldering, fusing, or the like. As may be appreciated, by avoiding use of external securing devices such as rivets, screws, external welds, and the like, the likelihood of wheel damage from scoring and scratching as imparted by such external securing devices on installation and removal of the weight 20 is greatly reduced, among other things.

Figure 3A:
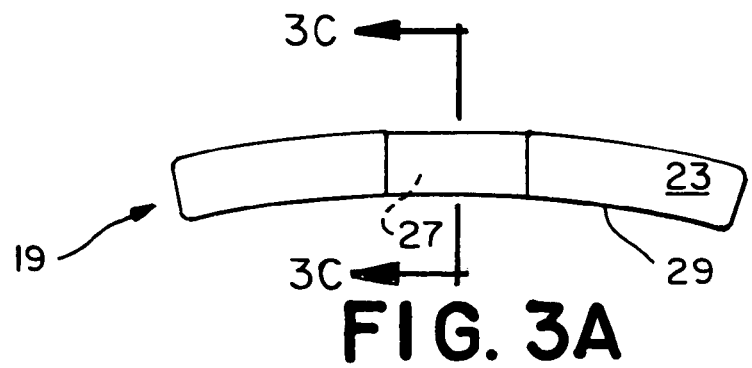
FIGS. 3A and 3B are outboard and inboard side views of the body of the weight of FIG. 1.
Figure 3B:
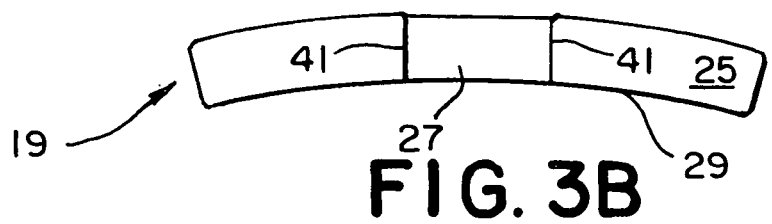
Figure 3C:
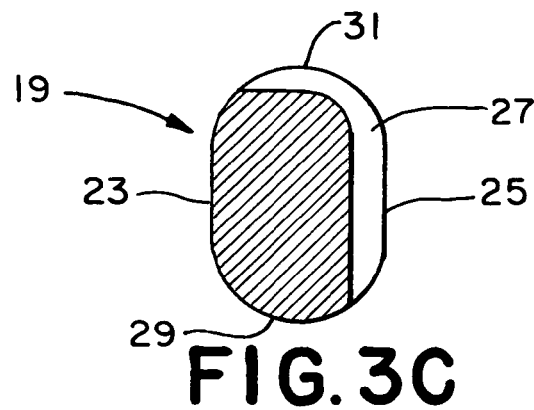
FIG. 3C is a cross-sectional view of the body of FIGS. 3A and 3B taken along the line 3C—3C in FIG. 3A.

In one embodiment of the present invention, and referring now to FIGS. 3B and 4D in particular, the body 19 in defining the recess 27 includes at the inboard face 25 thereof a pair of opposing lateral sides 41 that in fact demarcate the recess 27 at such inboard face 25 and define a width of such recess 27. Likewise, and referring now to FIGS. 4B and 4D in particular, the radial portion 33 of the clip 21 has a pair of opposing lateral edges 43 that in fact demarcate a width of such radial portion 33, where each lateral edge 43 of the radial portion 33 of the clip 21 corresponds to a lateral side 41 of the recess 27 of the body 19.

As may be appreciated, in the embodiment, the width of the radial portion 33 of the clip 21 is substantially the width of the recess 27 of the body 19 to which such clip is secured, and thus with the radial portion 33 of such clip 21 positioned within such recess at the inboard face 25 thereof, each lateral edge 43 of the radial portion 33 of the clip 21 is in a substantially abutting position with respect to the corresponding lateral side 41 of the body 19. As may be further appreciated, and as shown in FIGS. 4B and 4D, in such position, the lateral sides 41 of the body 19 may be crimped against the lateral edges 43 of the radial portion 33 of the clip 21 to secure the clip 21 from circumferential and axial movement with respect to a mounted-to wheel 12.

Figure 5:
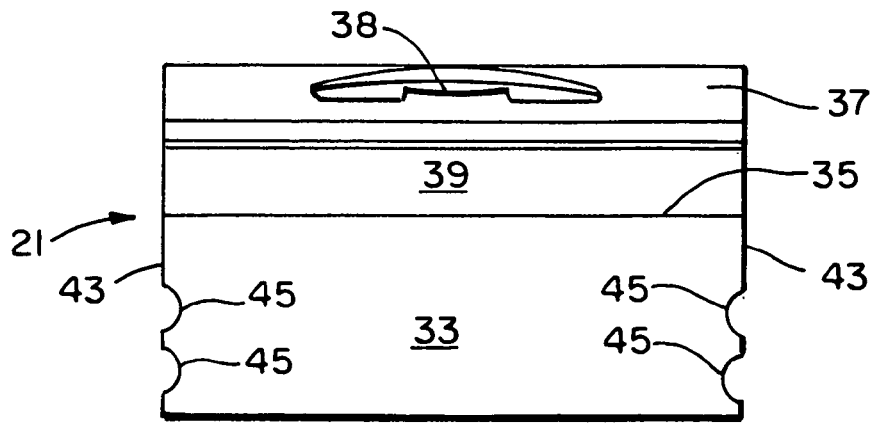
FIG. 5 is an inboard side view of the clip of FIGS. 4A–4C.

In a further embodiment of the present invention, and as best seen in FIG. 5, the lateral edges 43 of the radial portion 33 of the clip 21 may also be provided with lateral serrations 45 such as indentations or protrusions that interact with the corresponding crimped lateral sides 41 of the body 19. As may be appreciated, such lateral serrations 45 in interacting therewith act to secure the clip 21 from radial movement with respect to a mounted-to wheel 12. As shown, such lateral serrations 45 are arc-shaped cut-outs, but may also be any other variety of serration without departing from the spirit and scope of the present invention. For example, such lateral serrations 45 could comprise cut-outs or extensions shaped as arcs, triangles, or other shapes.

Note that as an alternative to crimping, the lateral sides 41 of the body 19 may instead be compressed or otherwise altered to flow the relatively soft body material into engagement with the lateral edges 43 of the radial portion 33 of the clip 21 and the lateral serrations 45 thereat. Such crimping or compressing may be achieved in any appropriate manner without departing from the spirit and scope of the present invention. For example, such crimping or compressing may be achieved by way of a chisel or knife cut, center punch, or similar punch adjacent the lateral sides of the body, or the like. Also, it may be the case that the clip 21 is wire-, plasma-, or laser-welded into the recess 27 of the body 19 to form the weight 20.

In one embodiment of the present invention, the clip 21 is formed from a hardened steel and the body 19 is formed from a pre-shaped soft, annealed steel. Note that although described primarily in terms of a steel body and a steel clip, the wheel weight 20 of the present invention can also comprise a body 19 and/or clip 21 constructed from any other appropriate material, including copper, zinc, brass, and the like.

In any embodiment of the present invention, the clip 21 and/or the body 19 of the weight 20 may be provided with a surface having a relatively high coefficient of friction to enhance gripping and to prevent slippage with regard to the flange 15. Such surface may be imparted during formation or may be imparted afterward by way of an appropriate surface coating.

In the foregoing description, it can be seen that the present invention comprises a new and useful wheel-balancing weight 20 with a body 19 formed from a material other than lead. The weight 20 has a clip 21 secured within a recess 27 of a body 19 in the axial, circumferential, and radial directions with respect to a mounted-to wheel 12, and the body 19 is well-nestled within a pocket 18 defined by a flange 15 of the wheel 12 when the weight 20 is mounted to such wheel 12. The weight 20 is simple in design and manufacture and therefore is affordable in cost.

It should be appreciated that changes could be made to the embodiments described above without departing from the inventive concepts thereof. For one example, the clip 21 may be secured to the body 19 at alternate faces and/or at multiple faces. For another example, the presence of a tire 10 is not essential to the present invention and the invention encompasses the use of the wheel-balancing weight 20 to counter-balance the wheel 12 only. It should be understood, therefore, that this invention is not limited to the particular embodiments disclosed, but it is intended to cover modifications within the spirit and scope of the present invention as defined by the appended claims.

What is claimed is:

1. A wheel-balancing weight for mounting to a wheel with a flange, the weight comprising a weighted body and a clip securely attached thereto, the body defining a recess therein, the clip having a securing portion formed to be securely positioned within the recess defined in the body and a grasping portion for securely grasping the flange, the recess of the body allowing the clip to be positioned with respect to such body so that the body is shifted toward the mounted-to wheel to achieve a proper fit to the wheel, the securing portion of the clip being secured within the recess by flowing a portion of the body adjacent such clip into contact therewith, the body having an outboard face for facing away from the mounted-to wheel and an opposing inboard face for facing toward the mounted-to wheel, the body defining the recess to extend along the inboard face, the body further having an inner radial face for facing toward an axis of the mounted-to wheel and an opposing outer radial face for facing away from the axis of the mounted-to wheel, the body further defining the recess to transition from the inboard face and along the outer radial face, the securing portion of the clip including a substantially planar radial portion positioned within the recess substantially parallel to the inboard face, and a substantially planar axial portion positioned within the recess substantially parallel to the outer radial face, wherein the body in defining the recess includes a pair of opposing lateral sides that demarcate the recess and define a width of such recess, and wherein the securing portion of the clip has a pair of opposing lateral edges that define a width of such securing portion, each lateral edge of the securing portion of the clip corresponding to a lateral side of the recess of the body, wherein the width of the securing portion of the clip is substantially the width of the recess of the body, and wherein with the securing portion of such clip positioned within such recess, each lateral edge of the securing portion of the clip is in a substantially abutting position with respect to the corresponding lateral side of the body, wherein the securing portion of the clip is secured within the recess by flowing each lateral side of the body toward the corresponding lateral edge of the securing portion of the clip, whereby the clip is prevented from at least circumferential and axial movement with respect to the mounted-to wheel, wherein each lateral edge of the securing portion of the clip defines a plurality of lateral serrations therein, the lateral serrations on each lateral edge extending along the corresponding lateral side of the recess with the securing portion of the clip positioned within the recess, substantially all of the lateral serrations interacting with the flowed lateral sides of the body to prevent the clip from radial movement with respect to the mounted-to wheel, wherein the body is formed from a steel material, wherein each lateral side of the body is substantially linear prior to being flowed toward the corresponding lateral edge of the clip, and wherein the steel material of the body is sufficiently ductile such that each lateral serration of each lateral edge is substantially completely contacted by the respective lateral side of the body after such lateral side is flowed toward the corresponding lateral edge of the clip having such lateral serration, whereby such substantially complete contact ensures that the clip is prevented from radial movement with respect to the mounted-to wheel.

2. The weight of claim 1 wherein the flange extends circumferentially with respect to the wheel and defines a circumferentially extending pocket adjacent the wheel within which the body of the weight is to be nestled to achieve proper balancing, and wherein the body extends in a generally arcuate manner to follow the generally circumferentially extending pocket of the wheel when the weight is mounted to such wheel.

3. The weight of claim 1 wherein the body extends in a generally arcuate manner and wherein the recess is generally centered with respect to the arcuate extent of the body.

4. The weight of claim 1 wherein the securing portion of the clip includes a generally planar radial portion positioned within the recess generally parallel to the inboard face.

5. The weight of claim 1 wherein the grasping portion of the clip co-acts with at least a portion of the securing portion to perform such grasping function, the grasping portion following along with but separate from such at least a portion of the securing portion such that the flange is fitted into a compartment defined therebetween and securely grasped therebetween.

6. The weight of claim 1 wherein the clip is secured within the recess by crimping a portion of the body adjacent such clip into contact therewith.

7. A vehicle having a wheel with a flange and a wheel-balancing weight mounted to the flange, the weight comprising a weighted body and a clip securely attached thereto, the body defining a recess therein, the clip having a securing portion formed to be securely positioned within the recess defined in the body and a grasping portion for securely grasping the flange, the recess of the body allowing the clip to be positioned with respect to such body so that the body is shifted toward the wheel to achieve a proper fit thereto, the securing portion of the clip being secured within the recess by flowing a portion of the body adjacent such clip into contact therewith, the body having an outboard face for facing away from the mounted-to wheel and an opposing inboard face for facing toward the mounted-to wheel, the body defining the recess to extend along the inboard face, the body further having an inner radial face for facing toward an axis of the mounted-to wheel and an opposing outer radial face for facing away from the axis of the mounted-to wheel, the body further defining the recess to transition from the inboard face and along the outer radial face, the securing portion of the clip including a substantially planar radial portion positioned within the recess substantially parallel to the inboard face, and a substantially planar axial portion positioned within the recess substantially parallel to the outer radial face, wherein the body in defining the recess includes a pair of opposing lateral sides that demarcate the recess and define a width of such recess, and wherein the securing portion of the clip has a pair of opposing lateral edges that define a width of such securing portion, each lateral edge of the securing portion of the clip corresponding to a lateral side of the recess of the body, wherein the width of the securing portion of the clip is substantially the width of the recess of the body, and wherein with the securing portion of such clip positioned within such recess, each lateral edge of the securing portion of the clip is in a substantially abutting position with respect to the corresponding lateral side of the body, wherein the securing portion of the clip is secured within the recess by flowing each lateral side of the body toward the corresponding lateral edge of the securing portion of the clip, whereby the clip is prevented from at least circumferential and axial movement with respect to the mounted-to wheel, wherein each lateral edge of the securing portion of the clip defines a plurality of lateral serrations therein, the lateral serrations on each lateral edge extending along the corresponding lateral side of the recess with the securing portion of the clip positioned within the recess, substantially all of the lateral serrations interacting with the flowed lateral sides of the body to prevent the clip from radial movement with respect to the mounted-to wheel, wherein the body is formed from a steel material, wherein each lateral side of the body is substantially linear prior to being flowed toward the corresponding lateral edge of the clip, and wherein the steel material of the body is sufficiently ductile such that each lateral serration of each lateral edge is substantially completely contacted by the respective lateral side of the body after such lateral side is flowed toward the corresponding lateral edge of the clip having such lateral serration, whereby such substantially complete contact ensures that the clip is prevented from radial movement with respect to the mounted-to wheel.

8. The vehicle of claim 7 wherein the body extends in a generally arcuate manner and wherein the recess is generally centered with respect to the arcuate extent of the body.

9. The vehicle of claim 7 wherein the securing portion of the clip includes a generally planar radial portion positioned within the recess generally parallel to the inboard face.

10. The vehicle of claim 7 wherein the clip is secured within the recess by crimping a portion of the body adjacent such clip into contact therewith.

* * * * *